United States Patent
Kim et al.

(10) Patent No.: US 8,767,121 B2
(45) Date of Patent: Jul. 1, 2014

(54) APPARATUS AND METHOD FOR CONVERTING MULTIMEDIA CONTENT, AND MULTIMEDIA CONTENT DISTRIBUTION SYSTEM

(75) Inventors: Su-hyun Kim, Seoul (KR); Hyok-sung Choi, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1283 days.

(21) Appl. No.: 11/773,717

(22) Filed: Jul. 5, 2007

(65) Prior Publication Data

US 2008/0186400 A1 Aug. 7, 2008

(30) Foreign Application Priority Data

Feb. 6, 2007 (KR) .................. 10-2007-0012348

(51) Int. Cl.
*H04L 29/00* (2006.01)
*H04N 21/2347* (2011.01)
*H04N 21/235* (2011.01)

(52) U.S. Cl.
CPC ......... *H04N 21/2347* (2013.01); *H04N 21/235* (2013.01)
USPC .............................. 348/441; 725/34; 370/386

(58) Field of Classification Search
CPC .................. H04N 21/2347; H04N 21/235
USPC .............................. 348/441; 725/34; 370/386
See application file for complete search history.

(56) References Cited

U.S. PATENT DOCUMENTS

| | | | |
|---|---|---|---|
| 6,055,314 A * | 4/2000 | Spies et al. | 380/228 |
| 6,233,253 B1 | 5/2001 | Settle et al. | |
| 2001/0030959 A1 * | 10/2001 | Ozawa et al. | 370/386 |
| 2002/0051469 A1 * | 5/2002 | Miller-Smith | 370/535 |
| 2006/0085817 A1 * | 4/2006 | Kim et al. | 725/34 |

FOREIGN PATENT DOCUMENTS

| | | |
|---|---|---|
| CN | 1636398 A | 7/2005 |
| KR | 10200112645 A | 2/2001 |
| KR | 1020010009630 A | 2/2001 |
| KR | 1020050027673 A | 3/2005 |
| KR | 1020070008146 A | 1/2007 |
| WO | 03/005719 A2 | 1/2003 |

OTHER PUBLICATIONS

Communication from the State Intellectual Property Office of P.R. China dated Mar. 24, 2011, in Application No. 200710147759.2.
Korean Office Action issued on Feb. 18, 2011 in the corresponding Korean Patent Application No. 10-2007-0012348.

* cited by examiner

*Primary Examiner* — Brandon Hoffman
*Assistant Examiner* — Michael D Anderson
(74) *Attorney, Agent, or Firm* — Sughrue Mion, PLLC

(57) ABSTRACT

A multimedia content conversion apparatus and method, and a multimedia content distribution system are provided. The apparatus includes a storage unit storing original data received from a multimedia content provider, an authentication unit determining whether a viewer is authorized with respect to the original data stored in the storage unit, a decryptor decrypting the original data if it is determined by the authentication unit that the viewer is authorized, and a data combiner combining the original data and the data decrypted by the decryptor. Accordingly, even if several TVs are installed in a home, a viewer can view desired multimedia content through all of the TVs with only one content conversion apparatus. Even when the viewer watches a TV in which the content conversion apparatus is not included, the viewer can view desired multimedia content by changing a channel of a TV which includes the content conversion apparatus. Since the content conversion apparatus provides content of various image standards, the viewer can view desired content regardless of a type of TV being used.

25 Claims, 5 Drawing Sheets

APPARATUS AND METHOD FOR CONVERTING MULTIMEDIA CONTENT, AND MULTIMEDIA CONTENT DISTRIBUTION SYSTEM

CROSS-REFERENCE TO RELATED PATENT APPLICATION

This application claims priority from Korean Patent Application No. 10-2007-0012348, filed on Feb. 6, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to conversion and distribution of multimedia content, and more particularly, to a centralized content conversion apparatus and method for converting and distributing multimedia content, and a system using the same.

2. Description of the Related Art

With the development of broadcasting technology and an increase of broadcast content, television (TV) broadcasting has expanded from conventional terrestrial TV broadcasting to satellite TV broadcasting, digital cable TV broadcasting and Internet Protocol (IP) TV broadcasting. Accompanying this trend, most content providing services have become paid services. In order to prevent paid content from being viewed by non-subscribers for a paid service, i.e. unauthorized users, content providing service providers transmit content to subscribers after encrypting the content. Thus, the subscribers must have a set-top box separate from a TV set in order to decrypt the encrypted content. Related art set-top boxes decrypt and decode received encrypted content and only provide the content to a TV set which is directly connected to the set-top box. That is, content bypassed to another TV set is still encrypted. Thus, if a family possesses several TV sets, the family should have set-top boxes corresponding to the number of TV sets in order to view encrypted content on all of the TV sets. That is, if a viewer wants to view content using a TV set located in a living room and continue viewing the content using a TV set located in a sleeping room after moving to the sleeping room, the viewer must move the TV set located in the living room to the sleeping room or install one more set-top box for the TV set located in the sleeping room.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a centralized content conversion method of allowing a viewer to view the same content through several display devices using only a single content conversion apparatus, and a system using the same.

According to an aspect of the present invention, there is provided an apparatus for converting multimedia content, the apparatus comprising: an authentication unit determining whether a viewer is authorized with respect to original data received from a multimedia content provider; a decryptor decrypting the original data if it is determined by the authentication unit that the viewer is authorized; and a data combiner combining a total or portion of the original data and the data decrypted by the decryptor.

According to another aspect of the present invention, there is provided an apparatus for converting multimedia content, the apparatus comprising: a storage unit storing original data received from a multimedia content provider; an authentication unit determining whether a viewer is authorized with respect to the original data stored in the storage unit; a decryptor decrypting the original data if it is determined by the authentication unit that the viewer is authorized; and a data combiner combining the original data and the data decrypted by the decryptor.

According to another aspect of the present invention, there is provided a method of converting multimedia content, the method comprising: receiving original multimedia content from a multimedia content provider; decrypting the original multimedia content data; and combining a total or portion of the original multimedia content data and the decrypted data.

According to another aspect of the present invention, there is provided a system for distributing multimedia content, the system comprising: a provider providing encrypted multimedia content; two or more display devices; and a content conversion apparatus directly connected to one of the two or more display devices, decrypting the encrypted multimedia content received from the provider, combining the decrypted data and a total or portion of the encrypted multimedia content, and transmitting the combined data to the other display devices.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Hereinafter, the present invention will be described in detail by explaining exemplary embodiments of the invention with reference to the attached drawings.

Figure 1:
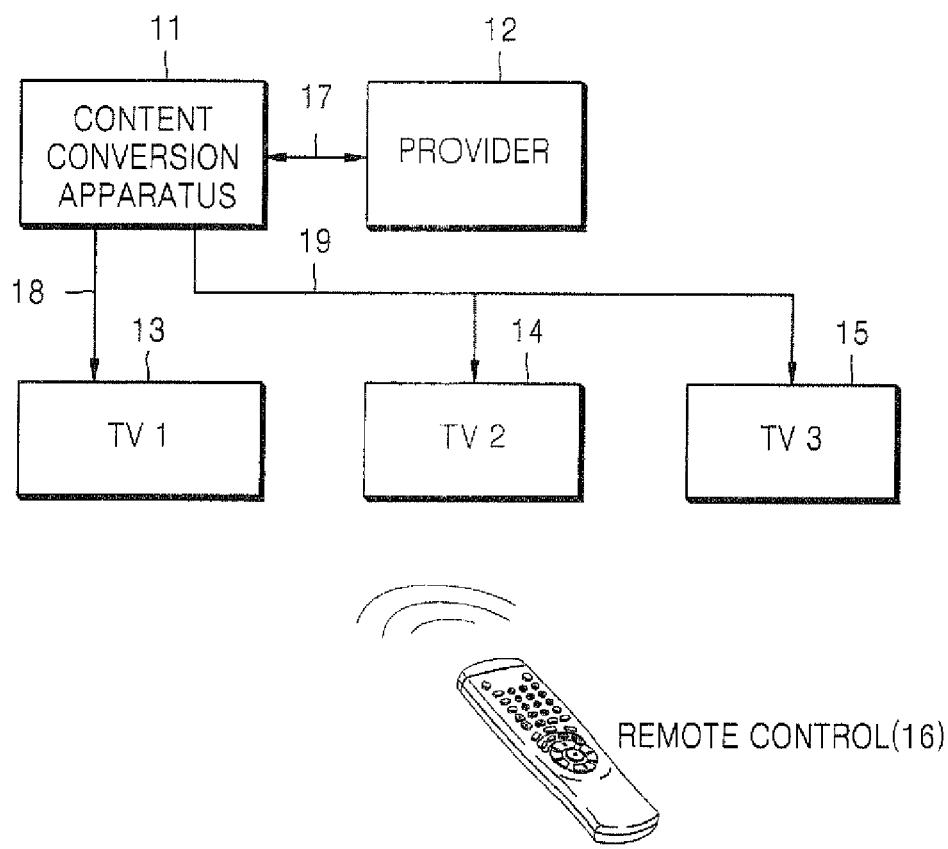
FIG. 1 is a system for converting and distributing multimedia content according to an exemplary embodiment of the present invention.

FIG. 1 is a system for converting and distributing multimedia content according to an exemplary embodiment of the present invention.

Referring to FIG. 1, a multimedia content conversion apparatus 11 receives multimedia content from a multimedia content provider 12 via a wired or wireless transmission channel 17. The multimedia content conversion apparatus 11 (hereinafter, 'content conversion apparatus' 11) can be directly connected to one display device (e.g., a first TV 13) among a plurality of display devices (e.g., TV) as a typical set-top box is. That is, the content conversion apparatus 11 can be directly connected to the first TV 13 by means of an interface 18, such as High-Definition Multimedia Interface (HDMI), Digital Visual Interface (DVI), S-Video, Component, or Composite. The multimedia content converted by the content conversion apparatus 11 is transmitted to the other display devices (e.g., a second TV 14 and a third TV 15) via another wired or wireless transmission channel 19. In other words, the content conversion apparatus 11 may be installed in the central display device 13 and distributes multimedia content to the other display devices 14 and 15 as a hub does.

In another exemplary embodiment of the present invention, the content conversion apparatus 11 can exist independently without being directly connected to a display device. That is, unlike FIG. 1, the first TV 13 may also be connected to the content conversion apparatus 11 via the wired or wireless transmission channel 19 as the other TVs 14 and 15 are. Thus, the first TV 13, the second TV 14, and the third TV 15 receive the same signal from the content conversion apparatus 11.

Although a TV broadcasting service is used as an example of a multimedia content providing service and a TV is used as an example of a display device hereinafter, the multimedia content providing service is not limited to the TV broadcasting service but may include all multimedia content services.

Figure 2:
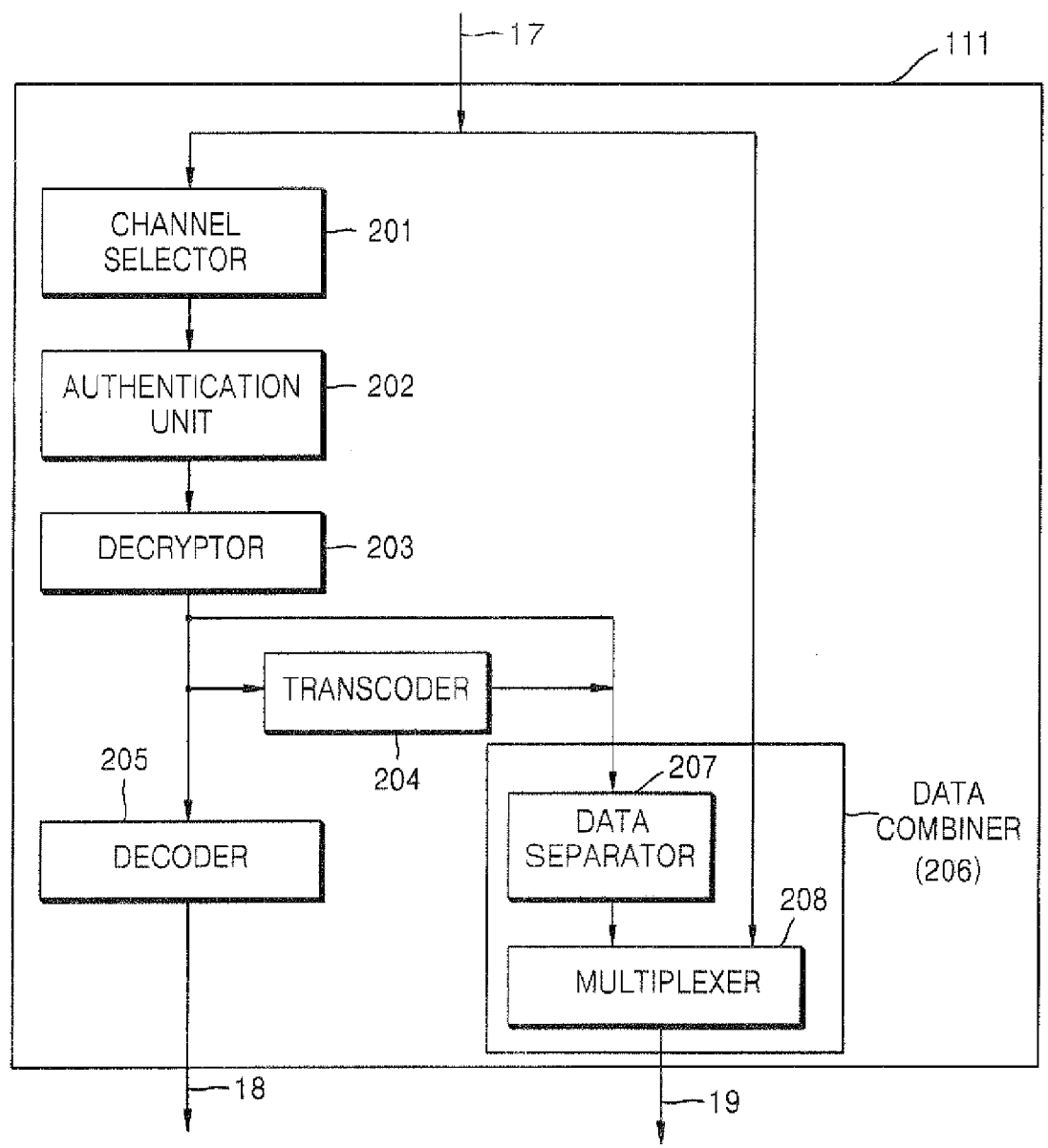
FIG. 2 is a block diagram of an exemplary embodiment of the multimedia content conversion apparatus illustrated in FIG. 1.

FIG. 2 is a block diagram of an exemplary embodiment 111 of the content conversion apparatus 11 illustrated in FIG. 1.

Referring to FIG. 2, the multimedia content conversion apparatus 111 receives multimedia content from the multimedia content provider 12.

Examples of the multimedia content provider 12 are satellite broadcasting stations, terrestrial broadcasting stations, cable broadcasting stations, IP TV service providers, and Pier-to-Pier (P-P) communication service providers.

Multimedia content data (e.g., broadcast data) received via the wired or wireless transmission channel 17 is input to a channel selector 201 and a data combiner 206.

The channel selector 201 filters and separates only broadcast data of a channel selected by a viewer from among received broadcast data of a plurality of channels.

An authentication unit 202 determines whether the viewer is authorized to view broadcast data of the channel selected by the viewer. That is, the authentication unit 202 determines whether the viewer was permitted and accepted by the broadcasting service provider 12 in advance to view broadcast data of the selected channel. According to an exemplary embodiment of the present invention, for the authentication, the provider 12 can issue a smart card or a Point of Deployment (POD) card for authentication to each viewer in advance and request the viewer to insert the card into the content conversion apparatus 111 for an authentication process.

If the authentication unit 202 determines that the viewer is authorized to view broadcast data of the selected channel, a decryptor 203 decrypts the encrypted broadcast data.

The content conversion apparatus 111 can further selectively include an image decoder 205. In general, since a TV has an image decoder, the content conversion apparatus 111 does not have to necessarily include the image decoder 205. If the content conversion apparatus 111 includes the image decoder 205, the image decoder 205 can be designed to decode only broadcast data which cannot be decoded by a decoder included in a TV. For example, if the first TV 13 is an analog TV, the first TV 13 cannot decode High Definition (HD)-class image data, such as MPEG2, Digital Video Express (DiVX), or XViD image data. Thus, the image decoder 205 of the content conversion apparatus 111 can decode HD-class image data and transmit the decoded image data to the first TV 13 to which the content conversion apparatus 111 is directly connected.

The broadcast data decrypted by the decryptor 203 may be directly transmitted to a data separator 207 included in the data combiner 206, or transcoded to other standard image data by a transcoder 204 and transmitted to the data separator 207.

The transcoder 204 converts various standard image data to image data of a standard, which can be processed by related art image devices. If the second and third TVs 14 and 15 are analog TVs, the second and third TVs 14 and 15 can reproduce only Standard Definition (SD)-class image data. However, if the transcoder 204 transcodes HD-class image data to SD-class image data and provides the SD-class image data to the second and third TVs 14 and 15, the viewer can view HD-class content through such a SD-class TV.

The data separator 207 separates the broadcast data directly received from the decryptor 203 from the broadcast data received via the transcoder 204 and modulates each broadcast data with a different frequency. For example, if channel Nos. 3 and 4 of frequency channels of original data received from the provider 12 are available, the data separator 207 modulates HD-class image data directly received from the decryptor 203 to a frequency of channel No. 3 and modulates SD-class image data received from the transcoder 204 to a frequency of channel No. 4.

A multiplexer 208 frequency-multiplexes the encrypted original data directly received from the provider 12 via the transmission channel 17 and the decrypted data received via the data separator 207. That is, the multiplexer 208 inserts the decrypted data into vacant channels (e.g., channel Nos. 3 and 4) of a frequency band of the original data. The multiplexed data is transmitted to the second and third TVs 14 and 15, which are indirectly connected to the content conversion apparatus 111 via the bypass channel 19.

In another exemplary embodiment of the present invention, the data combiner 206 may further include a selected-channel remover (e.g., a band pass filter) (not shown). The selected-channel remover removes channel data corresponding to a channel selected by the channel selector 201 from among data of a plurality of channels, which is contained in the original data.

In other words, the selected-channel remover filters and removes channel data corresponding to the data decrypted by the decryptor 203. The multiplexer 208 multiplexes the data of the remaining channels among the original data and the decrypted data received from the data separator 207.

Before the multiplexed data is transmitted to the second and third TVs 14 and 15, the content conversion apparatus 111 according to an exemplary embodiment of the present invention can encrypt the multiplexed data using Digital Rights Management (DRM) technology and transmit the encrypted multiplexed data to the second and third TVs 14 and 15. In this case, the second and third TVs 14 and 15 can reproduce the received broadcast data only if they have information related to the DRM technology. Here, the DRM technology can be any of related art DRM technologies.

Figure 3:
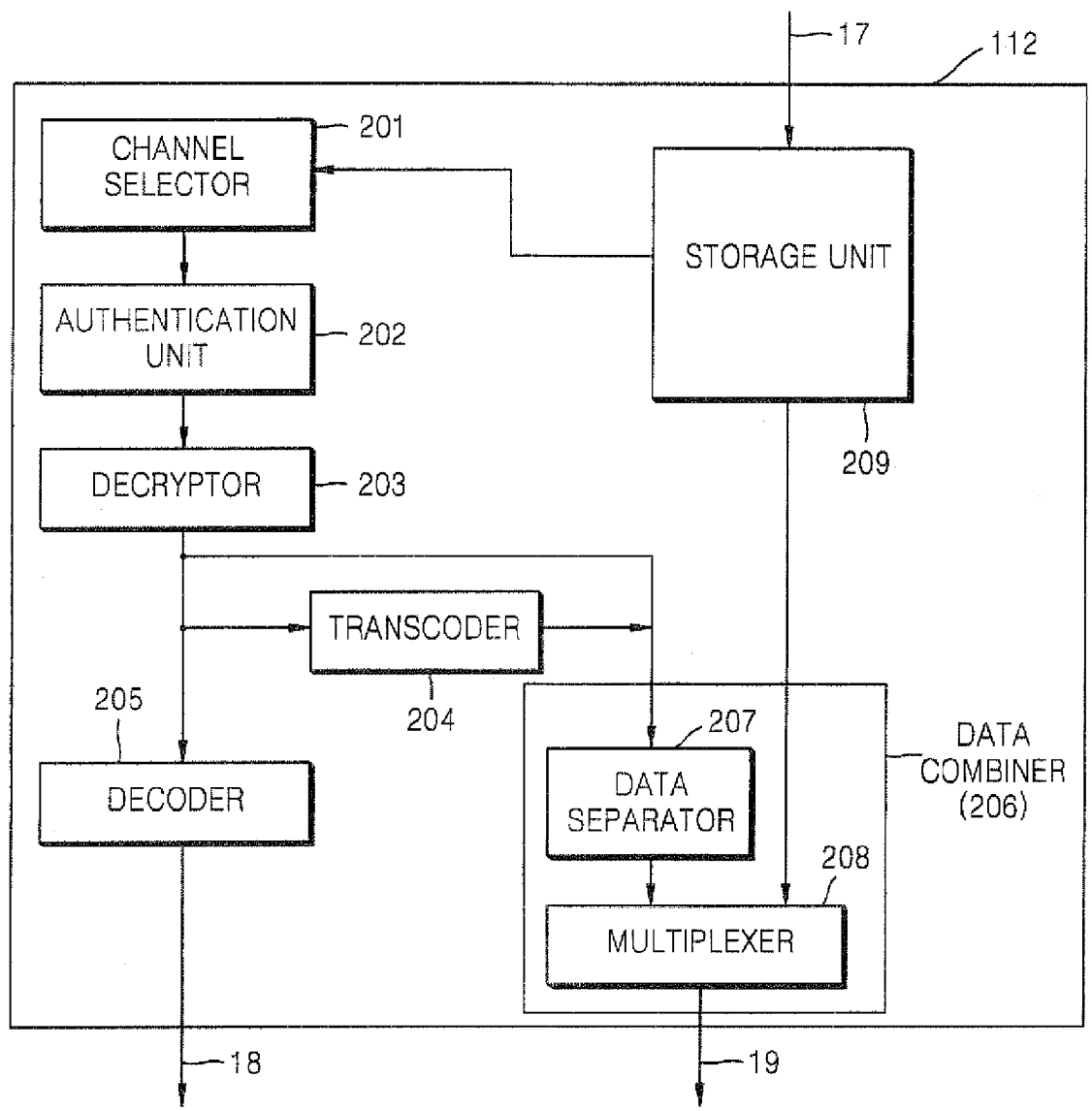
FIG. 3 is a block diagram of another exemplary embodiment of the multimedia content conversion apparatus illustrated in FIG. 1.

FIG. 3 is a block diagram of another exemplary embodiment 112 of the content conversion apparatus 11 illustrated in FIG. 1.

Compared to the content conversion apparatus 111 illustrated in FIG. 2, the content conversion apparatus 112 illustrated in FIG. 3 further includes a storage unit 209 storing multimedia content received from the provider 12.

While a viewer can view multimedia only in real-time when a related art set-top box is used, according to the exemplary embodiment the viewer can store content data received from the provider 12 in the storage unit 209 and view the content at a later time since the content conversion apparatus 112 (so called 'central media center') includes the storage unit 209.

Thus, according to the current exemplary embodiment, original data provided to the channel selector 201 and the multiplexer 208 included in the data combiner 206 is obtained from the storage unit 209.

Figure 4:
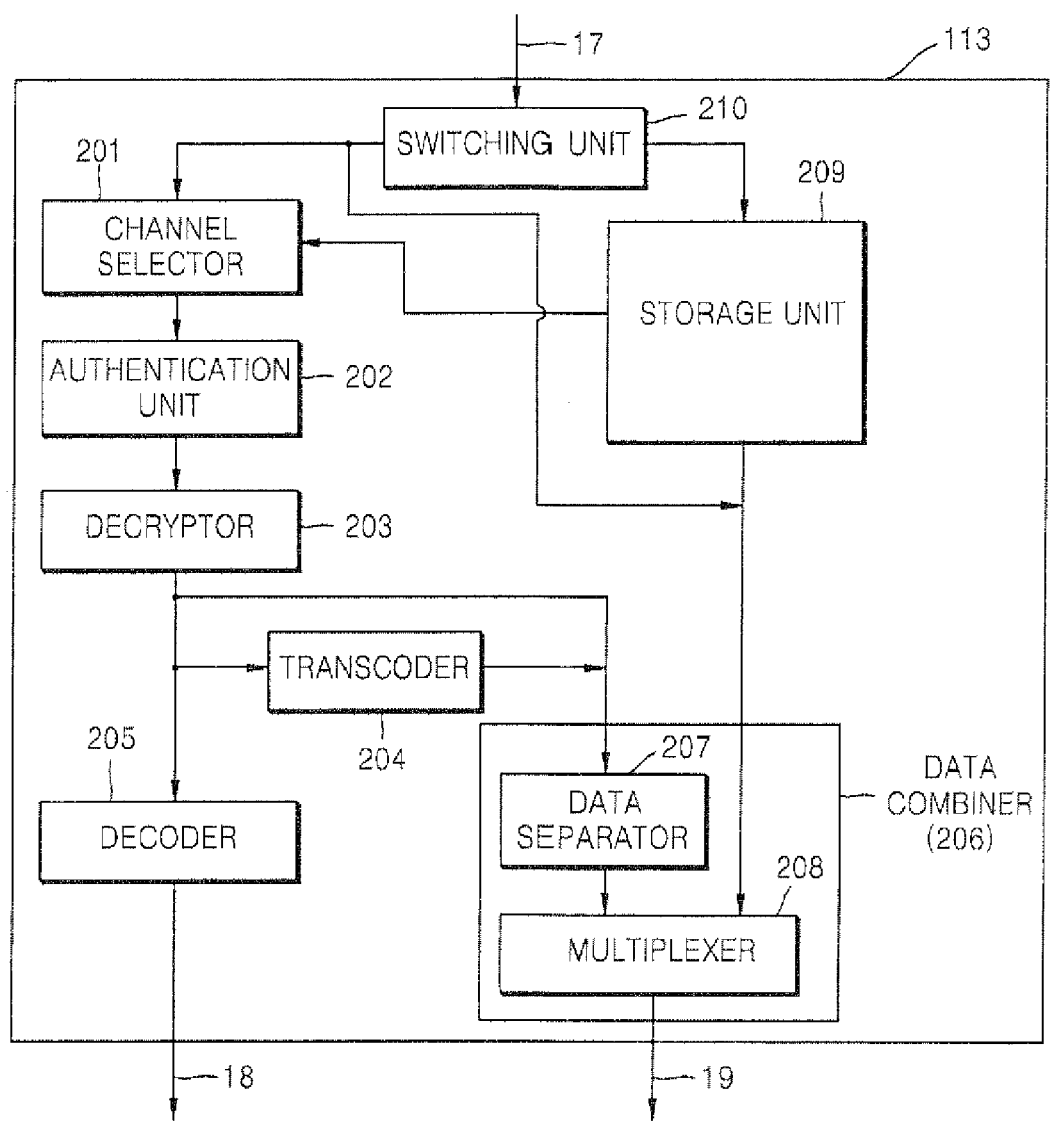
FIG. 4 is a block diagram of another exemplary embodiment of the multimedia content conversion apparatus illustrated in FIG. 1.

FIG. 4 is a block diagram of another exemplary embodiment of the content conversion apparatus 11 illustrated in FIG. 1.

Referring to FIG. 4, the content conversion apparatus 113 is another exemplary embodiment in which the content conversion apparatus 111 illustrated in FIG. 2 and the content conversion apparatus 112 illustrated in FIG. 3 are combined, and a viewer can immediately view received content or store the content data in the storage unit 209 to be viewed at a later time.

Thus, compared to the content conversion apparatus 111 or 112 illustrated in FIG. 2 or 3, the content conversion apparatus 113 further requires a switching unit 210. According to a selection of the viewer, the switching unit 210 transmits original data received from the provider 12 to the channel selector 201 or the storage unit 209.

Figure 5:
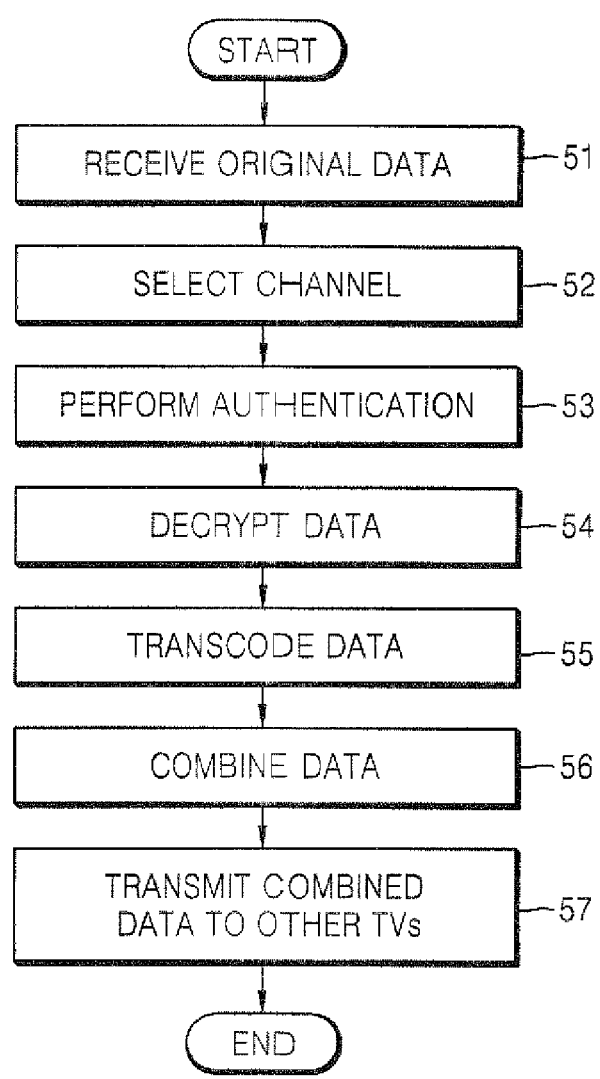
FIG. 5 is a flowchart of a multimedia content conversion method according to an exemplary embodiment of the present invention.

FIG. 5 is a flowchart of a multimedia content conversion method according to an exemplary embodiment of the present invention.

Referring to FIG. 5, the content conversion apparatus 11 receives original data in operation 51. That is, the content conversion apparatus 11 receives original multimedia content data from the content provider 12.

Content data of a specific channel is selected in operation 52. The received original data contains a plurality of pieces of multimedia content data of different frequency channels. Thus, only content data of a channel selected by a viewer is filtered and separated.

It is determined in operation 53 whether the viewer is authorized to view content of the selected channel.

The content data of the selected channel is decrypted in operation 54. In general, since content data is encrypted to prevent access of unauthorized users, if it is determined in operation 53 that the viewer is authorized to view content of the selected channel, the encrypted content data is decrypted in operation 54.

The content data is transcoded in operation 55. That is, the content data decrypted in operation 54 is transcoded from digital data to analog data or from HD-class data to SD-class data.

Data combination is performed in operation 56. That is, data is generated by multiplexing the content data decrypted in operation 54 or the data transcoded in operation 55 and the original data (or a portion of the original data) received in operation 51. In this case, the decrypted content data or the transcoded data is inserted into vacant frequency channels of the original data.

In another exemplary embodiment of the present invention, the multimedia content conversion method may further include removing channel data selected by the viewer from the original data before operation 56. In this case, only the original data from which the channel data selected by the viewer has been removed is multiplexed with the decrypted content data.

The data combined in operation 56 is transmitted to other TVs, which are not directly connected to the content conversion apparatus 11, in operation 57.

According to the multimedia content conversion apparatus and method of an exemplary embodiment of the present invention, since data of some channels (e.g., channel Nos. 3 and 4) of multiplexed data output from the data combiner 206 of the content conversion apparatus 111, 112, or 113 is already decrypted by the decryptor 203, the viewer can view the decrypted content of the channels even through the second and third TVs 14 and 15, which are not directly connected to the content conversion apparatus 11.

In addition, if the viewer wants to view content of another channel using the second or third TV 14 or 15 while viewing content on the first TV 13, the viewer can view content of a desired channel in the sleeping room by changing the channel of the first TV 13 which includes the content conversion apparatus 11, which is located in the living room, using a remote control 16 illustrated in FIG. 1. Since the viewer must be able to control the first TV 13 using the remote control 16 wherever the viewer is at home, the remote control 16 must be a Radio Frequency (RF) remote control of more than 2.4 GHz or a Bluetooth remote control.

As described above, according to the exemplary embodiments of the present invention, even if several TVs are installed at home, a viewer can view desired multimedia content through all of the TVs with only one content conversion apparatus.

Even when the viewer watches a TV in which the content conversion apparatus is not included, the viewer can view desired multimedia content by changing a channel of a TV including the content conversion apparatus.

Since the content conversion apparatus provides content of various image standards, the viewer can view desired content regardless of a type of TV.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for converting multimedia content, the apparatus comprising:
   a decryptor which decrypts a first portion of encrypted original content data to output first decrypted content data; and
   a data combiner which combines total or a second portion of the encrypted original content data and the first decrypted content data to output converted content data, wherein the first decrypted content data is transmitted to a first display device and the converted content data is transmitted to a second display device, the first and second display devices being connected to the apparatus.

2. An apparatus for converting multimedia content, the apparatus comprising:
   a storage unit which stores original content data received from a multimedia content provider;
   a decryptor which decrypts a first portion of encrypted original content data to output first decrypted content data; and a data combiner which combines total or a second portion of the encrypted original content data provided from the storage and the first decrypted content data to output converted content data, wherein the first decrypted content data is transmitted to a first display device and the converted content data is transmitted to a second display device, the first and second display devices being connected to the apparatus.

3. The apparatus of claim 1, wherein the data combiner further comprises a selected-channel remover which removes data of a channel selected by the viewer from the encrypted original content data to output the second portion of the encrypted original content data, wherein the data combiner combines the second portion of the encrypted original content data and the first decrypted content data.

4. The apparatus of claim 1, further comprising a channel selector which separates data of a channel selected by the viewer from the encrypted original content data.

5. The apparatus of claim 1, further comprising a transcoder which transcodes the first decrypted content data to data of an image standard different from an image standard of the original content data.

6. The apparatus of claim 5, wherein the image standard of the original content data is a High Definition (HD)-class, and the different image standard is a Standard Definition (SD)-class.

7. The apparatus of claim 1, wherein the data combiner comprises a data separator which separates the original content data according to image standards of the original content data.

8. The apparatus of claim 1, further comprising an image decoder which decodes the first decrypted content data.

9. The apparatus of claim 2, further comprising a switching unit which selectively stores content received from the multimedia content provider in the storage unit.

10. A method of converting multimedia content, the method comprising:

decrypting a first portion of encrypted original multimedia content data to output first decrypted multimedia content data; and combining total or a second portion of the encrypted original multimedia content data and the first decrypted multimedia content data to output converted multimedia content data, wherein the first decrypted multimedia content data is transmitted to a first display device and the converted multimedia content data is transmitted to a second display device, the first and second display devices being connected to the apparatus.

11. The method of claim 10, further comprising transcoding the first decrypted multimedia content data.

12. The method of claim 11, wherein the combining comprises multiplexing the first decrypted multimedia content data and the transcoded data with the original multimedia content data.

13. The method of claim 10, further comprising separating only multimedia content data selected by a viewer from the original multimedia content data.

14. The method of claim 10, further comprising determining whether the viewer is authorized to view selected content.

15. The method of claim 10, further comprising removing data of a channel selected by the viewer from the original multimedia content data before the combining begins.

16. The method of claim 10, further comprising determining, using a smart card or a Point of Deployment (POD) card, whether the viewer is authorized to view the original multimedia content data.

17. A system for distributing multimedia content, the system comprising:

a provider which provides encrypted multimedia content data;

a plurality of display devices including a first display device and a second display device;

a content conversion apparatus directly connected to the first display device;

a decryptor which decrypts a first portion of the encrypted multimedia content data received from the provider to output a first decrypted multimedia content data, and a combiner which combines the first decrypted multimedia content data and total or a second portion of the encrypted multimedia content data received from the provider to output converted multimedia content data, wherein the first decrypted multimedia content data is transmitted to the first display device and the converted multimedia content data is transmitted to the second display device.

18. The system of claim 17, wherein a first display device directly connected to the content conversion apparatus receives the first decrypted multimedia content data from the content conversion apparatus and reproduces the first decrypted multimedia content data.

19. The system of claim 17, further comprising a remote control which controls the first display device directly connected to the content conversion apparatus.

20. The system of claim 19, wherein the remote control is a Radio Frequency (RF) remote control of more than 2.4 GHz or a Bluetooth remote control.

21. The apparatus of claim 1, wherein the apparatus is directly connected to a first television via a first channel and indirectly connected to a second television via another channel.

22. The apparatus of claim 1, further comprising:

a transcoder which transcodes the first decrypted data transmitted to a second television to a different standard; and a decoder which decodes the first decrypted data transmitted to a first television without conversion by the transcoder, wherein the transcoded content data is provided to the combiner prior to the transmission to the second television.

23. The apparatus of claim 1, further comprising a transmitter that transmits the converted content data to at least two display devices.

24. The apparatus of claim 1, wherein the first decrypted content data is content data of a specific channel selected by the authorized viewer and wherein the encrypted original content data that is not decrypted comprises a plurality of pieces of multimedia content data of different frequency channels.

25. The apparatus of claim 1, wherein the data combiner combines the total or the second portion of the encrypted original content data with the first decrypted content data by multiplexing the total or the second portion of the encrypted original content data with the first decrypted content data.

* * * * *